Figure 1:
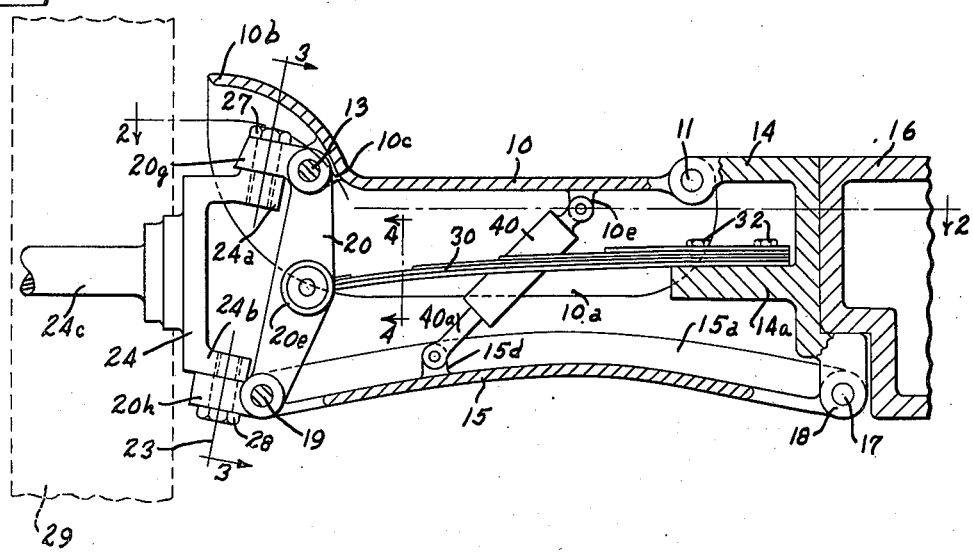

March 28, 1950        P. T. TUCKER        2,501,796

INDEPENDENT WHEEL SUSPENSION

Filed Aug. 14, 1946        4 Sheets-Sheet 1

INVENTOR
PRESTON T. TUCKER

BY
Toulmin & Toulmin
ATTORNEYS

March 28, 1950      P. T. TUCKER      2,501,796
INDEPENDENT WHEEL SUSPENSION
Filed Aug. 14, 1946      4 Sheets—Sheet 2
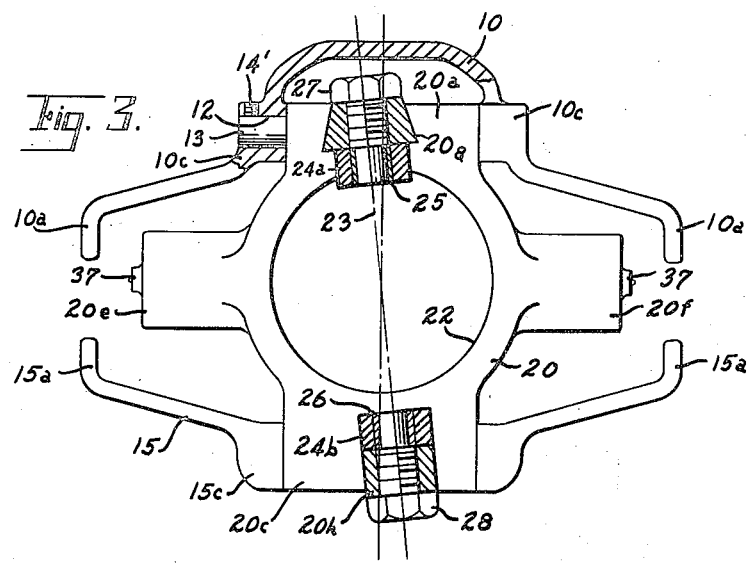
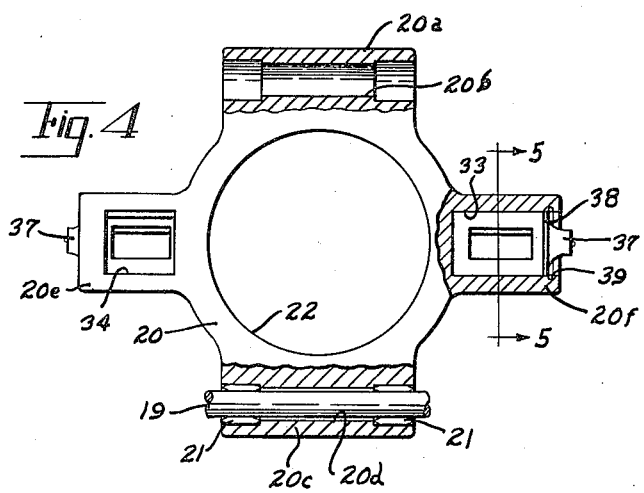
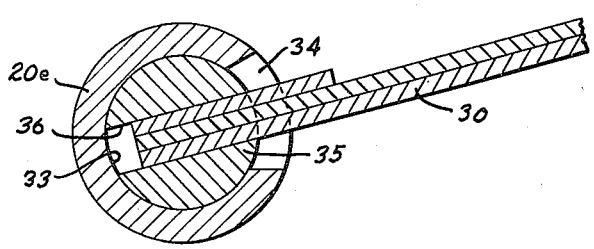
INVENTOR
PRESTON T. TUCKER
BY
Toulmin & Toulmin
ATTORNEYS

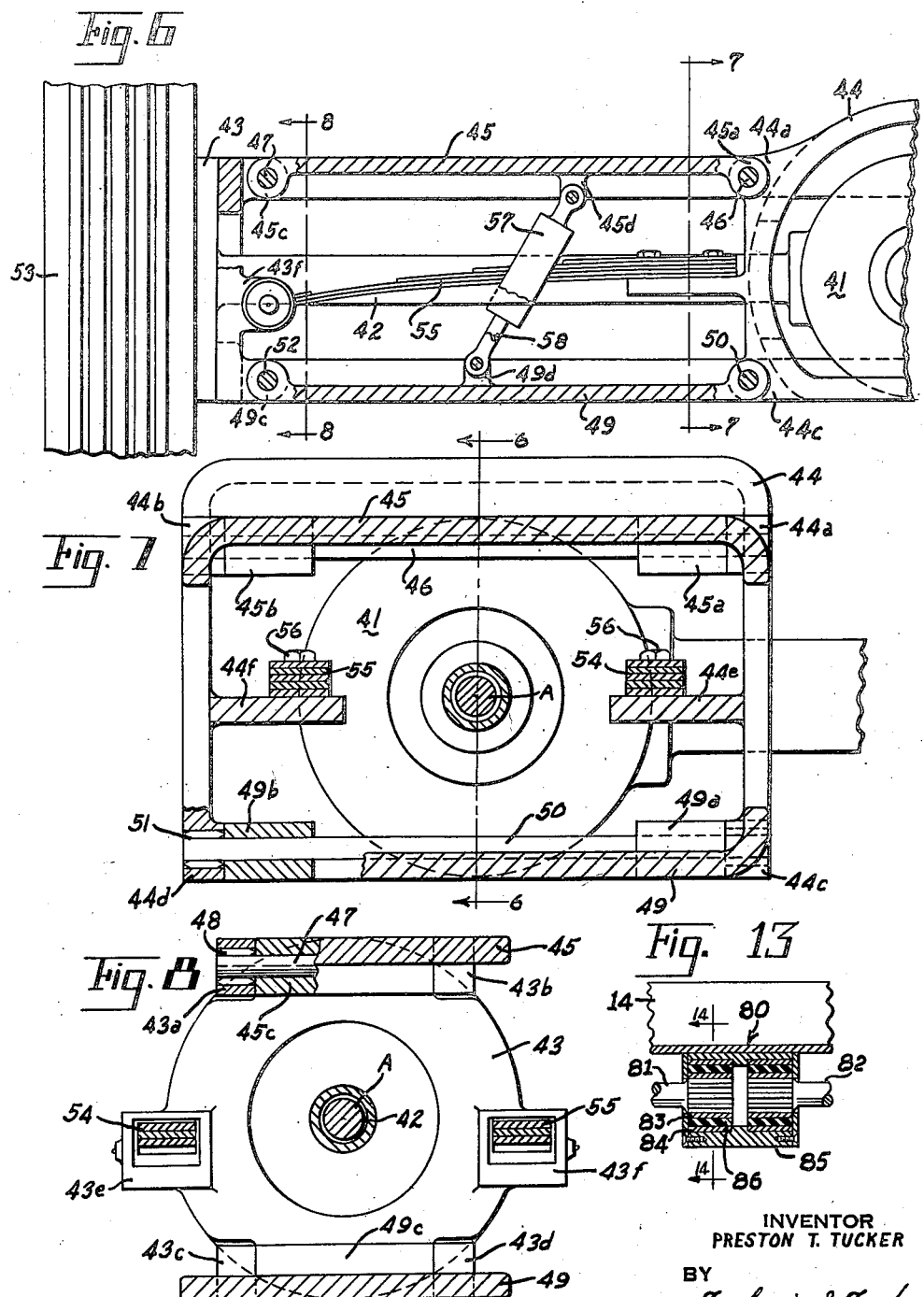

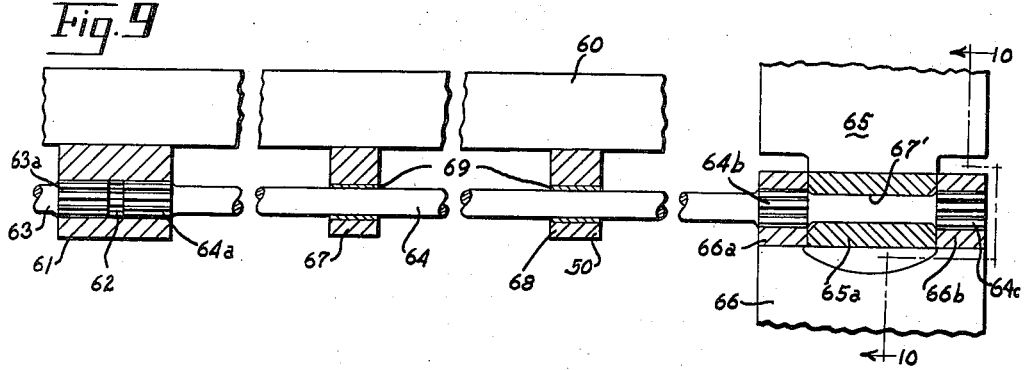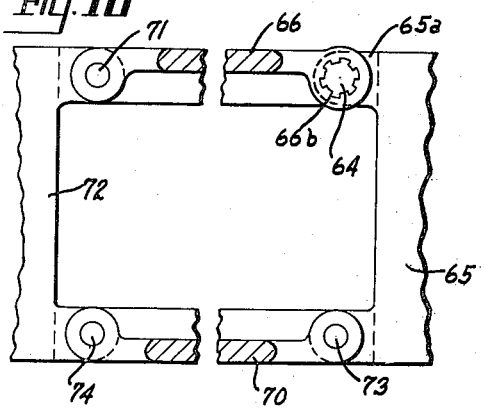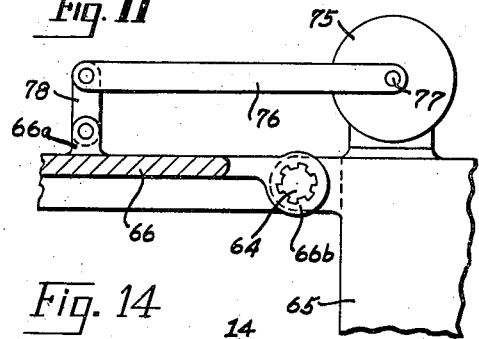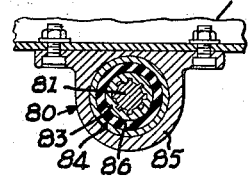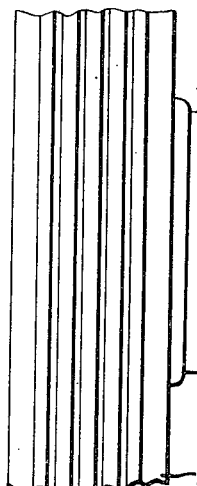

Patented Mar. 28, 1950

2,501,796

UNITED STATES PATENT OFFICE 2,501,796

INDEPENDENT WHEEL SUSPENSION

Preston T. Tucker, Ypsilanti, Mich., assignor to Tucker Corporation, Chicago, Ill., a corporation of Delaware Application August 14, 1946, Serial No. 690,428

8 Claims. (Cl. 280—124)

This invention relates to independent wheel suspensions for vehicles of the automotive or self-propelled type wherein each wheel is independently suspended and sprung.

One object of the invention is to provide a suspension for each wheel that may be assembled, attached and detached from the vehicle as a unit.

Another object is to provide a wheel suspension in which the unsprung weight of the wheel and parts connected therewith is a minimum for the capacity or size of the vehicle for which it is intended.

A further object is to provide an independent wheel suspension of the transverse articulated type wherein the upper and lower suspension arms are formed to enclose and protect the springs, shock absorbers, and pivotal bearings.

A still further object is to provide an independent wheel suspension of the type aforesaid, wherein a plurality of springs are employed which perform the additional function of providing increased longitudinal strength and stability, and which aid in absorbing brake and driving torque reaction while at the same time affording efficient springing action.

Another object is to provide an independent suspension wherein the suspension arms, springs and shock absorbers are arranged in an extremely compact, efficient manner and one wherein the arms and springs are fixed to a single unitary part adapted, in turn, for connection to the vehicle.

A further object is to provide a wheel suspension wherein the usual leaf or coil springs are replaced by a torque rod or shaft so that the springing movement of the arms are resisted by twisting of the rod.

It is also an object to provide a wheel suspension wherein a torque rod or shaft provides the springing movement for the wheel suspension, and in which there is an additional resilient means for anchoring the fixed end of the torque rod.

A still further object is to provide a driving wheel suspension that is simple, compact, efficient and that enables the driving axle weight to be kept at a minimum for the capacity and size of the vehicle for which it is designed.

Figure 2:
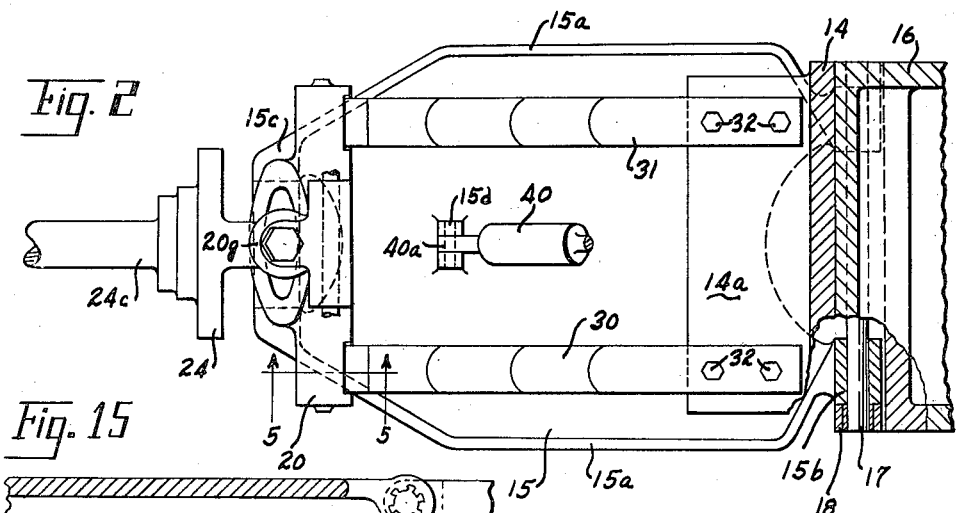
Figure 15:
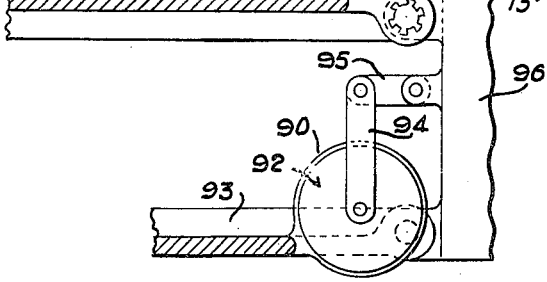

Other objects and advantages of my invention will become more apparent upon reference to the following description taken in connection with the accompanying drawings in which:

In the drawings:

Figure 1 shows a cross-sectional view of my invention as applied to one front wheel of an automotive vehicle, Figure 2 is a cross-sectional view taken substantially upon the line 2—2 of Figure 1 looking in the direction of the arrows and showing the dual spring arrangement, Figure 3 is a section through the king pin axis, taken along the line 3—3 of Figure 1 and showing in end elevation the upper and lower suspension arms and their steering knuckle support, Figure 4 is an elevational view looking in the direction of arrows 4, Figure 1, of the steering knuckle support with parts sectioned to show the yoke pin bearings and spring anchors, Figure 5 is a section taken substantially on line 5—5, Figure 2, showing the outer anchor for the outer end of one cantilever spring used in my wheel suspension, Figure 6 is an elevational view, partly in section, of one form of my invention used to suspend the driving wheels of an automotive vehicle, Figure 7 is a section taken upon the line 7—7, Figure 6, looking in the direction of the rear axle differential housing and showing said housing and the torque tube connected therewith, Figure 8 is a section taken on line 8—8, Figure 6, looking in the direction of the arrows, and showing the manner of connecting the outer ends of the cantilever springs to the brake drum housing, Figure 9 is a view, partly in section, showing a modification wherein the leaf springs of the forms shown at Figures 1 to 8, are replaced by torsion rods, Figure 10 is a view, partly in section, taken substantially upon the line 10—10, Figure 9, Figure 11 is a view, partly in section, of a construction similar to that illustrated in Figures 9 and 10, but showing a different arrangement of shock absorber, Figure 12 is a view of a construction similar to Figures 9 and 10, but showing a still different form and arrangement of shock absorber, Figure 13 is a fragmentary view showing a modified arrangement for anchoring the end of the torque bars which includes a resilient mounting for the said ends, Figure 14 is a transverse section indicated by the line 14—14 on Figure 13, and Figure 15 is a view illustrating how the shock absorber can be cast integrally with one of the suspension arms.

Referring in detail to the drawings, and particularly to Figures 1 to 5, 10 indicates an upper suspension arm pivoted at 11 to an anchor frame 14 rigidly attached to a member 16 which may be a part of the vehicle chassis. As shown at Figure 1, arm 10 may have skirt portions 10a projecting downwardly at opposite sides of the suspension to thereby partially enclose and protect the springs, steering knuckle support and other parts connected therewith. A hood 10b may, if desired, extend upwardly and over the steering knuckle and king pin assembly, to protect these parts from injury.

At its outer end, arm 10 has a pair of spaced integral thickened portions or lugs 10c formed with aligned bearing apertures 12, Figure 3, to form a yoke within which a yoke pin 13 is fixed, as by means of a set screw 14'.

A lower suspension arm 15 is slightly arched in transverse vertical section, as shown at Figure 1 and has its opposite transverse edges bent upwardly as at 15a, to form stiffening ribs or flanges. At its inner end, arm 15 is provided with bearing sleeves 15b to form a yoke having aligned apertures within which a yoke pin 17 is fixed as by set screws, not shown. Pin 17 is journaled within aligned bearing apertures formed in lugs 18 integral with, and projecting downwardly from anchor frame 14. At its outer end, arm 15 is formed as a yoke 15c, Figure 3, with aligned apertures, as at its inner end. A yoke pin 19 is fixed within these apertures as by keys or set screws, not shown.

The steering knuckle support 20 is shaped, as clearly shown at Figures 3 and 4, to provide an upper boss 20a having a bore 20b to receive yoke pin 13. Bore 20b is enlarged at its ends to form a cylindrical space about pin 13 within which needle roller bearings similar to 21, Figure 4, are mounted to journal support 20 upon pin 13. As shown at Figure 3, boss 20a has a snug fit between the portions 10c of arm 10. Support 20 also has a lower boss 20c with bore 20d parallel to bore 20b and similarly formed to receive and be journaled on yoke pin 19, by means of needle roller bearings 21.

By the foregoing construction, suspension arms 10 and 15, and steering knuckle support 20, are mounted for oscillation only in a plane normal to the axes of pins 11, 13, 17 and 19; and it will be noted that the axes of these pins form what is conveniently referred to as a "parallelogram." However, the effective length of the upper suspension arm, that is, the distance between pins 11 and 13, is appreciably shorter than the effective length of lower suspension arm 15, that is, the distance between pins 17 and 19. As well understood by those skilled in the art, the short upper arm and long lower arm operate to cause the tread to remain constant and to vary the camber as the suspension and its wheel move up and down relatively to the chassis. This slight change in camber causes the wheel to remain more nearly "square" with the road as the vehicle "rolls" on the turn. If the effective lengths of the two arms were made equal to define a true parallelogram the camber would remain constant but the tread would vary as the suspension arms move up and down.

Support 20 has a lightening opening 22 and oppositely projecting lugs 20e and 20f, forming spring anchors, subsequently described. Said support also has opposed lugs 20g and 20h projecting outwardly therefrom as best shown at Figure 1, and having aligned apertures defining the king pin axis 23. As will be noted from Figures 1 and 3, the parts are so related as to cause axis 23 to tilt upwardly and inwardly to provide the desired king pin inclination, and upwardly and rearwardly to provide the desired caster, whereby the axis 23 intersects the road surface slightly in advance of the area of tire contact.

Steering knuckle 24 is formed with lugs 24a and 24b adapted to snugly fit between lugs 20g and 20h of support 20. These lugs are provided with openings having bushings 25 and 26 fitting the smooth cylindrical ends of cap screws 27 and 28 threaded into the aligned openings in lugs 20g and 20h. In this manner, knuckle 24 is journaled upon support 20 for pivotal movement upon an axis defined by aligned cap screws, that is, the king pin axis. Knuckle 24 has formed integrally therewith the wheel axle 24c upon which a wheel 29 is pivoted by anti-friction bearings, not shown.

Anchor member 14 is formed with an integral ledge 14a, Figures 1 and 2, to which a pair of cantilever leaf springs 30 and 31 are secured as by bolts 32. Lug 20e projecting from support 20, has a cylindrical bore 33 therein and an opening 34 through its side wall facing toward ledge 14a. See Figure 5. A bearing pin 35 is pivotally supported within bore 33 and has a diametrically and axially extending slot 36. The outer end of spring 30 projects through opening 34 and fits snugly within slot 36, whereby the spring is slidably and pivotally connected to lug 20e of support 20. It will be understood that the end of spring 31 is similarly mounted within lug 20f. A plate 38 having a grease nipple 37 closes the outer end of each bore 33 and is held in place by a swage ring 39.

Arm 10 has lugs 10e formed on the under side thereof while arm 15 has lugs 15d formed on its upper side. A shock absorber cylinder 40 has an extension pivoted between lugs 10e and a plunger 40a is pivoted between lugs 15d. Shock absorber cylinder 40 may be of any suitable type using springs or liquid whereby movement of plunger 40a within cylinder 40 is resisted; and because of the relation of the arms and absorber shown at Figure 1, oscillation of the arms causes a change in distance between lugs 10e and 15d, and thus effects relative sliding between parts 40 and 40a. This motion is resisted by the parts within cylinder 40, to dampen oscillations of the spring and prevent road shocks from being transmitted to the vehicle body.

By the foregoing construction I have provided an individual front wheel suspension for an automotive vehicle, that is compact, relatively simple and easy to construct yet gives the maximum strength for its weight. It will be noted that each suspension uses two cantilever springs, spaced longitudinally, whereby they not only float the attached wheel, but also add to the rigidity of the suspension in the longitudinal vertical plane and assist in absorbing brake torque reaction. At the same time, they provide an intermediate protected space wherein shock absorbers may be mounted. The skirt portions 10a and hood 10b of the upper arm, in cooperation with the upwardly-projecting flanges 15a of the lower arm, cooperate substantially to fully enclose the springs, shock absorbers, steering knuckle support and their interconnecting bearings. Furthermore, the unsprung weight is kept at a minimum.

In Figures 6 to 8, I have shown a form of my invention designed for the driving wheels of an automotive vehicle, wherein 41 indicates the differential gear housing, 42 the housing for axle A, and 43 the brake shoe and wheel bearing support, all of more or less conventional construction and rigidly united for movement as a unit. A frame 44 encloses the housing 41 and carries four pair of bosses, of which pairs 44a, 44b and 44c, 44d, are shown in Figure 7. It will be understood that this construction is duplicated at the right side of frame or housing 44, as viewed in Figure 6.

An upper suspension arm 45 has integral spaced bosses 45a and 45b snugly fitting between bosses 44a and 44b, and a yoke pin 46 passes through aligned apertures in all said bosses. Pin 46 is preferably secured to arm 45 by means such as set screws, not shown, to thus provide a bearing axle upon which the arm may oscillate upon frame 44. It will be understood that needle roller bearings, not shown, may be interposed between pin 46 and the interior bearing surfaces of bosses 44a and 44b. At its outer end, arm 45 has a boss 45c within which a yoke pin 47 is fixed in any desired manner. The wheel bearing and brake shoe support 43 carries bosses 43a, 43b, Figure 8, having aligned apertures within which the ends of pin 47 are journaled on needle roller bearings 48. A lower suspension arm 49 is pivoted upon housing 44 by means of bosses 49a, 49b, a yoke pin 50, bosses 44c, 44d and roller bearings 51, in the same manner as upper arm 45, as will be obvious from inspection of Figure 7. Likewise arm 49 is pivotally connected at its outer end to housing 43, by means of boss 49c, pin 52, Figure 6, and a lower pair of bosses 43c and 43d, Figure 8, integral with housing 43. From Figure 6 it will be noted that the effective lengths of arms 45 and 49, that is, the distances between pins 46, 47, and 50, 52, are the same. Likewise, the distances between pins 46, 50 and 47, 52 are the same, whereby the four pins define a parallelogram and arms 45, 49 are at all times parallel. Likewise the plane of wheel 53 is maintained vertical.

Housing 44 is provided with integral spring ledges 44e and 44f to which the inner ends of a pair of cantilever springs 54 and 55 are respectively secured, as by bolts 56. At their outer ends, the springs are pivotally and slidably attached to spaced lugs 43e and 43f in the same manner as has been described in connection with springs 30 and 31 in the suspension of Figures 1 to 5.

Spaced apertured lugs 45d on the under side of arm 45 are used to pivotally connect thereto a shock absorber cylinder 57. A pair of lugs 49d are attached to the upper side of arm 49 and pivotally mount the plunger 58 coacting with cylinder 57 in a well known manner. As pivotal movement of arms 45 and 49 relatively to housing 44 effects a change in distance between lugs 45d and 49d, plunger 58 is thereby caused to move within cylinder 57 and vibrations of the springs are dampened.

The operation of this form of my invention will now be clear. Housing 44 is attached to the vehicle chassis to move as a unit therewith. Therefore, as wheel 53 moves upwardly and downwardly in passing over an uneven road surface, differential housing 41 and shaft 42 move as a unit therewith about the universal joint of the drive shaft as a pivot, relatively to housing 44 and the vehicle chassis. Upward movement is resisted by springs 55, and the oscillations of arms 45 and 49 are dampened by shock absorber 57.

This construction which is duplicated for each driving wheel of the vehicle, provides a full floating rear axle wherein the driving thrust of the wheels is transmitted through arms 45 and 49 directly to the housing 44 and the chassis. No bending moments are therefore imposed upon tube 42. Analysis will show that tube 42 is required to take only a certain amount of directly applied tension and compression. It may therefore be greatly reduced in size over the conventional construction wherein the axle shaft housing must absorb bending movements due to load, wheel thrust, as well as torsion due to reactions to motor torque. As arms 45 and 49 may be separated by a substantial distance and are pivotally connected at their inner ends to the housing 44, the effective unsprung weight is greatly reduced with my suspension over that necessary with a conventional mounting of equal capacity. As in the construction described at Figures 1 to 5, inclusive, the separation of the two springs in the longitudinal direction not only provides effective suspension but acts to assist arms 45 and 49 in absorbing motor reaction and braking torque. As a result, I have provided an efficient, simple, compact driving wheel suspension wherein the unsprung weight may be kept at minimum. The easy-riding qualities of such suspension is obvious to those skilled in the art.

At Figures 9 to 12, inclusive, I have shown a modification in which the leaf cantilever springs used in Figures 1 to 8, inclusive, may be replaced by torsion rods. Referring to Figure 9, 60 indicates members or channels fixed to an automotive chassis. An anchor block 61 is secured to member 60 and has a splined opening 62 formed to receive the splined ends 63a and 64a of torsion rods 63 and 64, one of which extends forwardly and the other rearwardly. As the forward and rear suspensions may be the same so far as concerns the modification now being described, only one rod, 64 is shown.

Numeral 65 indicates a frame member corresponding either to anchor member 14, Figure 1, or housing 44, Figure 6, and having a boss 65a formed with a longitudinally-extending aperture 67'. A suspension arm 66, corresponding either to arm 10 of Figure 1, or to arm 45, Figure 6, has integral bosses, 66a, 66b with aligned openings splined to receive the correspondingly splined sections 64b and 64c of an end portion of shaft 64. The smooth section of rod 64 between splined sections 64b and 64c is journaled within the aperture in boss 65a and acts as a yoke pin pivotally connecting member 65 and arm 66. Rod 64 may be solid or hollow, as desired, and is supported at spaced intervals along its length by any desired number of bearing blocks 67, 68 having bushings 69 which the shaft rotatably fits. As shown at Figure 10, 66 is the upper arm. However, this is merely for illustration only as it is clear that torque rod 64 may be connected with the lower suspension arm without departing from the invention. In Figure 10, the outer end of arm 66 is shown pivotally connected at 71 to a member 72 which may correspond to support 20 in the species of Figures 1 to 5, or to support 43 in the species illustrated in Figures 6 to 8. A lower arm 70 is pivotally connected at 73 to member 65, and at 74 to support 72. While the connections at 64, 71, 73 and 74 have been shown at Figure 10 as defining a parallelogram, I desire to have it understood that this is not essential but that arms 66 and 70 may have different effective lengths when used for a non-driving wheel, as in the case of arms 10 and 15, Figure 1.

Various means for damping the modification of Figures 9 and 10 may be employed. At Figure 11 I have shown a shock absorber housing 75 of the radial arm type rigidly attached to member 65. Arm 76 whose pivotal movement in both directions about axis 77 is yieldingly resisted by conventional means within housing 75, is connected at its opposite end with arm 66 by lug 66c and a link 78, all as will be obvious from inspection of Figure 11.

In Figure 12 I have shown a suspension of the type of Figures 9 and 10 with a shock absorber 79 which may be of the same general construction as 40, Figure 1, or 57, Figure 6. However, a slightly different form of attachment is employed wherein the absorber is pivotally connected at 80 to arm 70 while its plunger 81 has an eye pivoted on pin 71 to thus render unnecessary connecting lugs such as 15d, Figure 1.

As wheel 53 moves over uneven road surfaces, the resulting oscillation of arms 66 and 70 relatively to part 65 is resisted by torsional forces set up in rods 64 whereby it effectively functions for the same purpose as the cantilever springs of the previous forms of my invention. As this rod is of relatively simple construction, it is clear that no lubrication problems are involved such as are a source of trouble with more conventional types of springs, while replacements in the case of breakage may be quickly, easily and inexpensively made, since only one relatively simple rod need be replaced.

As an improvement over the construction shown in Figures 9 through 12, there may be provided a resilient means generally indicated at 80' for supporting the ends of the torque bars which are indicated at 81' and 82. The resilient mountings comprise an inner sleeve 83 which receives the splined ends on the torque bars and an outer sleeve 84 which is receivable in fixed relationship in the anchor block 85.

Between the sleeves 83 and 84 there is a resilient member 86 which may comprise rubber or rubber-like substance which is capable of being intimately joined with the sleeves 83 and 84. This type of anchor provides an additional resilience for the torque bar which is mainly effective during initial movement of the said bar so that slight irregularities in the road will be absorbed in the rubber-like portion of the mounting before any substantial twisting of the torque bar takes place.

In Figure 15 there is shown an arrangement wherein the body 90 of a shock absorber generally indicated at 92 is cast integrally with the lower arm 93 of the wheel suspension. The shock absorber includes an arm 94 which is connected by the drag link 95 with the frame 96 which carries the wheel suspension. The arrangement shown in Figure 15 operates substantially the same as that shown in Figure 11 except that the shock absorber body and the anchor for the arm of the shock absorber are reversed in their location.

While I have shown various specific embodiments of my invention numerous changes, modifications, and substitutions of equivalents will be obvious to those skilled in this art. Hence, I do not desire to be limited to the precise forms shown but wish it understood that the invention extends to and embraces all such modifications and substitutions as fall within the scope of the subjoined claims.

What I desire to claim and secure by United States Letters Patent is:

1. In a wheel suspension for automotive vehicles, a member adapted for rigid connection to said vehicle, a pair of substantially parallel arms pivoted to said member on parallel vertically-spaced first axes, a support pivotally connected to said arms on vertically-spaced second axes parallel to said first axes, a pair of longitudinally spaced cantilever springs anchored at one end to said member, means pivotally and slidably connecting said springs to said support at their other ends, and a wheel bearing axle connected to said support.

2. In a wheel suspension for vehicles having a chassis, a pair of vertically spaced arms, means pivotally connecting the inner ends of said arms to said chassis on respective vertically-spaced axes, a support connected to the outer ends of said arms on respective vertically-spaced axes, all said axes being parallel, a pair of substantially parallel spaced cantilever springs anchored at their inner ends to said first means, pins journaled on said support, each pin having a diametrically and axially extending slot within which the outer end of a corresponding spring is received, and a wheel bearing axle supported at least in part by said support.

3. In an independent wheel suspension for vehicles, an anchor member adapted for attachment to said vehicle, upper and lower arms pivotally connected at one end to said member on vertically spaced axes, said arms having flanges substantially enclosing a space therebetween, wheel supporting means pivotally connected to the other ends of said arms on vertically spaced axes, all said axes being parallel and defining the corners of a deformable quadrilateral, a pair of spaced, substantially parallel springs fixed at one end to said member and at the other end to said supporting means, said springs being located within the space enclosed by said arms, and a shock absorber connecting said arms between said springs.

4. In an independent wheel suspension, a steering knuckle support having spaced parallel bearing apertures and a pair of diametrically opposite lugs having aligned bores lying between and parallel to said apertures, there being a circumferentially and axially extending opening in each said lug opening into the bore therein, a second pair of lugs on said support having openings adapted to mount a king pin on an axis parallel to the plane determined by said apertures, upper and lower arms having pins at one end journaled within said apertures, respectively, a pair of springs having their outer ends passing through said openings, respectively, and a single member to which the other ends of said arms and springs are connected.

5. A wheel suspension comprising a frame, a wheel bearing support, a drive gear housing adjacent said frame, a tube rigidly connecting said housing and support, upper and lower suspension arms articulated at opposite ends to said frame and support on spaced parallel axes defining a parallelogram, and elongated spring means fixed at one end to said frame and at the other end to said support.

6. An independent wheel suspension for vehicles comprising a hollow frame, a wheel bearing support, a gear housing within said frame, a hollow axle rigidly connecting said housing and support, upper and lower suspension arms articulated at opposite ends to said frame and said support on parallel axes defining a parallelogram, a leaf spring anchored at one end to said frame, means pivotally and slidably connecting the other end of said spring to said support, said spring lying between said arms, and shock absorber means pivotally connected to said arms.

7. In a driving wheel suspension for automotive vehicles, an open frame, upper and lower suspension arms pivoted at their inner ends to said frame on vertically spaced axes, a wheel bearing support, means pivotally connecting the outer ends of said arms to said support on vertically spaced axes, all said axes being parallel and defining a parallelogram, a gear housing within said frame, an axle connecting said housing and support and lying between said arms, a pair of cantilever springs anchored at one end to said frame between said arms and on opposite sides of said axle, and means pivotally connecting the other ends of said springs to said support.

8. In an independent wheel suspension for vehicles, a frame member, upper and lower substantially parallel suspension arms pivoted at their inner ends to said member on vertically spaced parallel axes, a wheel support, means pivoting each arm to said support on vertically-spaced parallel axes, said axes forming a deformable quadrilateral, a leaf spring anchored at one end to said member, and a pin journaled in said support having a diametrically and axially extending slot in which the other end of the spring is slidably received.

PRESTON T. TUCKER.

REFERENCES CITED

The following references are of record in the file of this patent:

UNITED STATES PATENTS

| Number | Name | Date |
|---|---|---|
| 1,693,111 | Fonnaca | Nov. 27, 1928 |
| 1,882,484 | Carpenter et al. | Oct. 11, 1932 |
| 1,903,694 | Burney | Apr. 11, 1933 |
| 2,070,775 | Bell | Feb. 16, 1937 |
| 2,073,267 | Prouty | Mar. 9, 1937 |
| 2,122,961 | Seibler | July 5, 1938 |
| 2,162,828 | Slack | June 20, 1939 |
| 2,173,973 | Leighton | Sept. 26, 1939 |
| 2,278,303 | Blaser | Mar. 31, 1942 |

FOREIGN PATENTS

| Number | Country | Date |
|---|---|---|
| 250,230 | Italy | Sept. 22, 1926 |
| 591,983 | France | July 22, 1925 |